United States Patent
Tung et al.

(10) Patent No.: US 7,379,138 B2
(45) Date of Patent: May 27, 2008

(54) TRANSFLECTIVE LIQUID CRYSTAL DISPLAY HAVING FIRST AND SECOND VOLTAGE POTENTIALS SELECTED TO ACHIEVE PREDETERMINED POLARIZATION STATES FOR LIGHT ENCOUNTERING RESPECTIVELY THE TRANSMISSIVE AND REFLECTIVE AREAS

(75) Inventors: Hsiu Chi Tung, Taipei (TW); Chih Ming Chang, Jhongli (TW); Chih Jen Hu, Jhongli (TW)

(73) Assignee: AU Optronics Corporation, Hsinchu (TW)

( * ) Notice: Subject to any disclaimer, the term of this patent is extended or adjusted under 35 U.S.C. 154(b) by 447 days.

(21) Appl. No.: 11/150,058

(22) Filed: Jun. 9, 2005

(65) Prior Publication Data

US 2006/0279670 A1 Dec. 14, 2006

(51) Int. Cl.
G02F 1/1335 (2006.01)
(52) U.S. Cl. .................................... 349/114
(58) Field of Classification Search ................ 349/114
See application file for complete search history.

(56) References Cited

U.S. PATENT DOCUMENTS 6,795,147 B1 * 9/2004 Starkweather .............. 349/114
7,133,095 B2 * 11/2006 Kang ......................... 349/114
2005/0094068 A1 * 5/2005 Ikeno et al. ................. 349/114

FOREIGN PATENT DOCUMENTS

| CN | 1561457 A | 1/2005 |
|---|---|---|
| CN | 1599879 A | 3/2005 |
| JP | 2004-133511 | 4/2004 |
| JP | 2004-157509 | 6/2004 |
| JP | 2004-199030 | 7/2004 |

* cited by examiner

Primary Examiner—David C. Nelms
Assistant Examiner—John Heyman
(74) Attorney, Agent, or Firm—Ware, Fressola Van Der Sluys & Adolphson, LLP (57) ABSTRACT

In a transflective LCD, it is possible to cause the change in the optical characteristics of the liquid crystal layer in the transmission area between operating states to be different from the change in the optical characteristics of the liquid crystal layer in the reflection area by using different applied voltages in the transmission and reflection areas. In the first operating state, the liquid crystal layer in the transmission area and the liquid crystal layer in the reflection area are used as a half-wave plate to change the linear polarization axis of the traversing light. In the second operating state, the liquid crystal layer in the transmission area does not affect the polarization axis of the traversing light, but the liquid crystal layer in the reflection area is used as a quarter-wave plate. As such, no additional half-wave plates and quarter-wave plates are needed.

19 Claims, 13 Drawing Sheets

TRANSFLECTIVE LIQUID CRYSTAL DISPLAY HAVING FIRST AND SECOND VOLTAGE POTENTIALS SELECTED TO ACHIEVE PREDETERMINED POLARIZATION STATES FOR LIGHT ENCOUNTERING RESPECTIVELY THE TRANSMISSIVE AND REFLECTIVE AREAS

FIELD OF THE INVENTION

The present invention relates generally to a liquid crystal display panel and, more particularly, to a transflective-type liquid crystal display panel.

BACKGROUND OF THE INVENTION

Due to the characteristics of thin profile and low power consumption, liquid crystal displays (LCDs) are widely used in electronic products, such as portable personal computers, digital cameras, projectors, and the like. Generally, LCD panels are classified into transmissive, reflective, and transflective types. A transmissive LCD panel uses a back-light module as its light source. A reflective LCD panel uses ambient light as its light source. A transflective LCD panel makes use of both the back-light source and ambient light.

Figure 1:
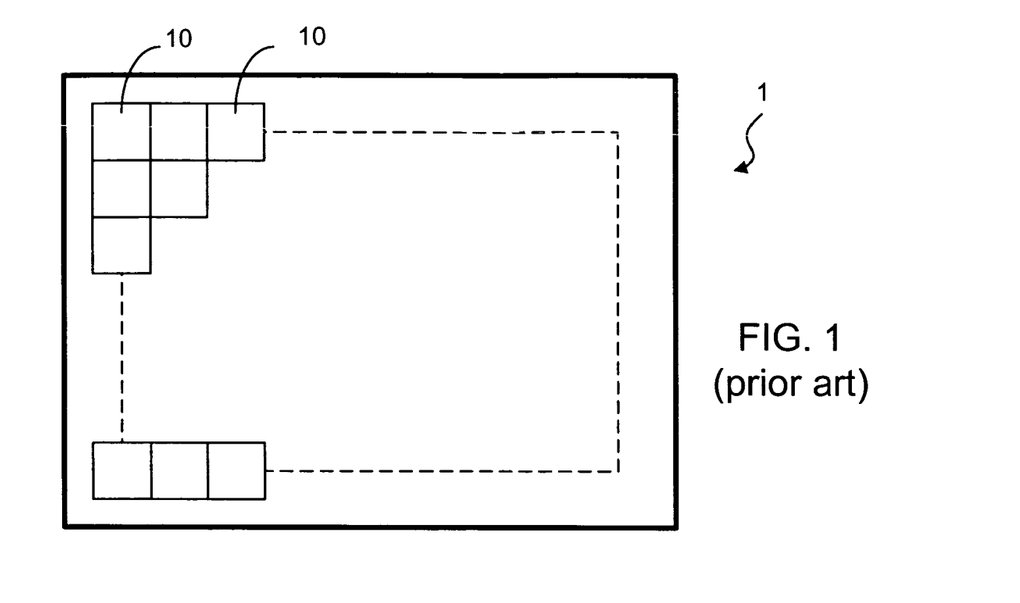
FIG. 1 is a schematic representation of a prior art liquid crystal display panel.
Figure 2:
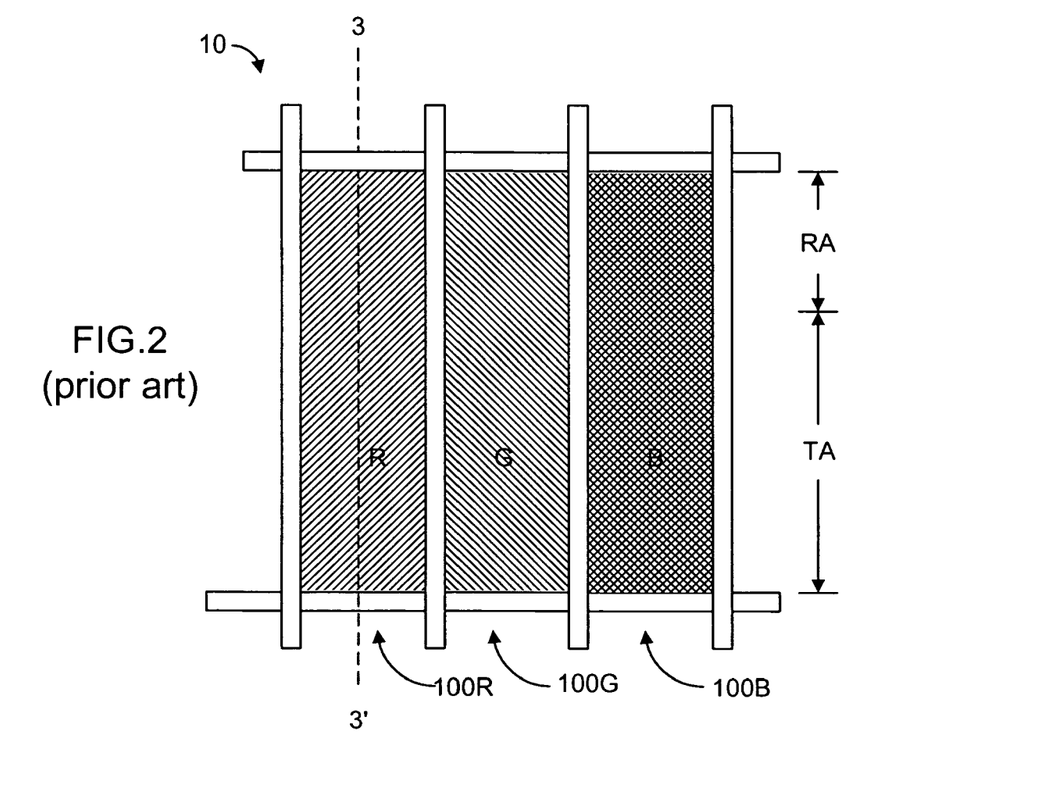
FIG. 2 is a schematic representation of a pixel in a prior art color LCD panel.
Figure 3:
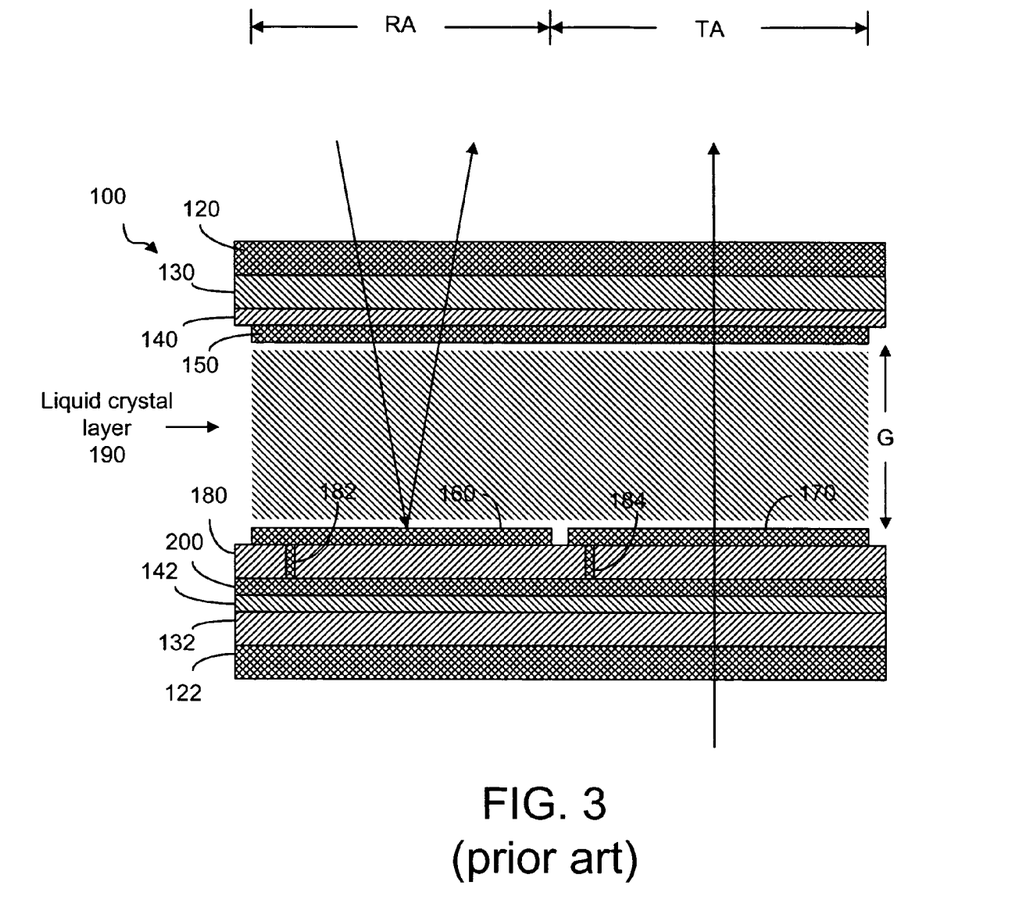
FIG. 3 is a schematic representation showing a cross sectional view of a sub-pixel in a prior art single-gap LCD.

As known in the art, a color LCD panel 1 has a two-dimensional array of pixels 10, as shown in FIG. 1. Each of the pixels comprises a plurality of sub-pixels, usually in three primary colors of red (R), green (G) and blue (B). These RGB color components can be achieved by using respective color filters. FIG. 2 illustrates a plan view of the pixel structure in a conventional transflective liquid crystal panel, and FIG. 3 is a cross sectional view of the pixel structure. As shown in FIG. 2, a pixel can be divided into three sub-pixels 100R, 100G and 100B and each sub-pixel can be divided into a transmission area (TA) and a reflection area (RA).

A typical sub-pixel 100 is shown in FIG. 3. As shown, the sub-pixel segment 100 has an upper layer structure, a lower layer structure and a liquid crystal layer 190 disposed between the upper layer structure and the lower layer structure. The upper layer comprises a polarizer 120, a haft-wave plate 130, a quarter-wave plate 140, a color filter (not shown) and an upper electrode 150. The upper electrode 150 is made from a substantially transparent material such as ITO (Indium-tin oxide). The lower layer structure comprises an electrode layer having a transmissive electrode 170 and a reflective electrode 160. The transmissive electrode 170 is made from a transparent material such as ITO. The reflective electrode 160 also serves as a reflector and is made from one or more highly reflective metals such as Al, Ag, Cr, Mo, Ti, and AlNd. The lower layer structure further comprises a passivation layer (PL) 180, a device layer 200, a quarter-wave plate 142, a half-wave plate 132 and a polarizer 122. In addition, the transmissive electrode 170 is electrically connected to the device layer 200 via a connector 184, and the reflective electrode 160 is electrically connected to the device layer 200 via a connector 182.

In the transmission area as shown in FIG. 3, light from a back-light source enters the pixel area through the lower layer structure, and goes through a liquid crystal layer and the upper layer structure. In the reflection area, light encountering the reflection area goes through the upper layer structure and the liquid crystal layer before it is reflected by a reflective electrode 160.

The sub-pixel structure as shown in FIG. 3 is known as a single-gap structure. In a single-gap transflective LCD, one of the major disadvantages is that transmittance of the transmission area (the V-T curve) and reflectance in the reflection area (the V-R curve) do not reach their peak values in the same voltage range. As a result, reflectance experiences an inversion while transmittance is approaching its higher value.

Figure 4:
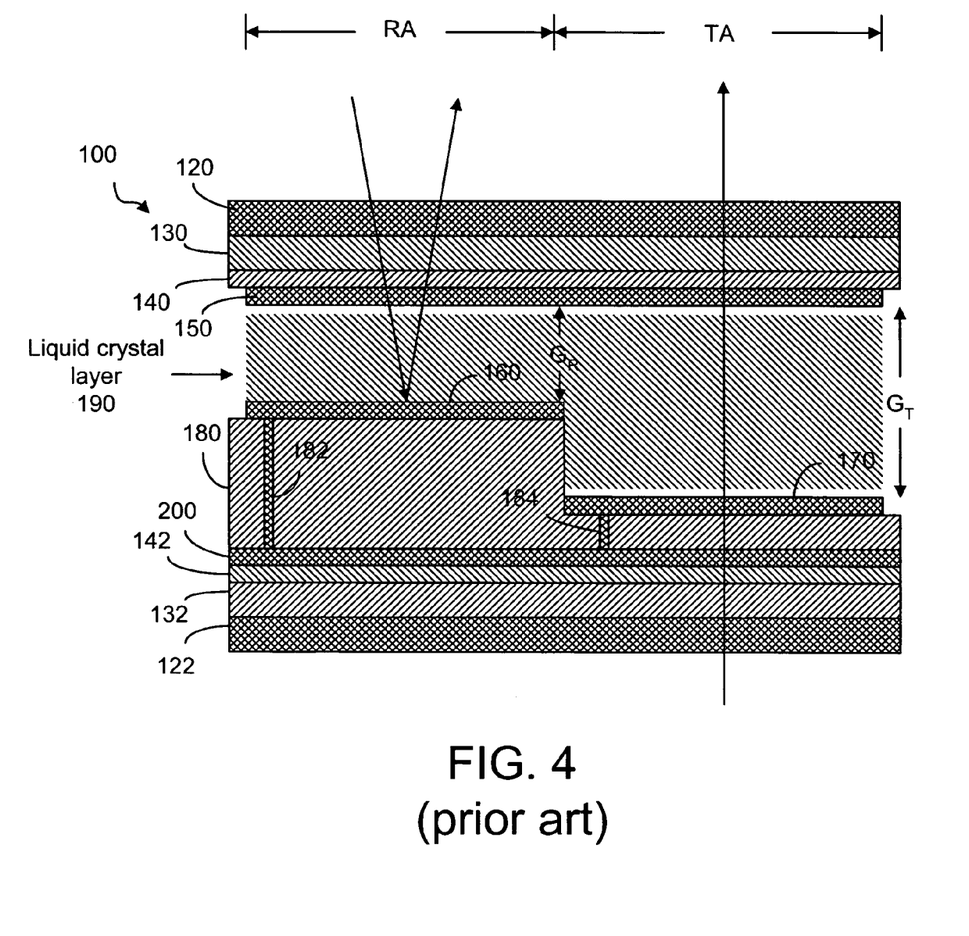
FIG. 4 is a schematic representation showing a cross sectional view of a sub-pixel in a prior art dual-gap LCD.

In order to overcome this inversion problem, a dual-gap design is used in a transflective LCD. In a dual-gap transflective LCD, as shown in FIG. 4, the gap $G_R$ in the reflection area is half the gap $G_T$ in the transmission area. Thus, the thickness of the liquid crystal layer 190 in the reflection area is one half the thickness of the liquid layer 190 in the transmission area. As such, the transmittance and the reflectance of the LCD are more consistent with each other.

Figure 5A:
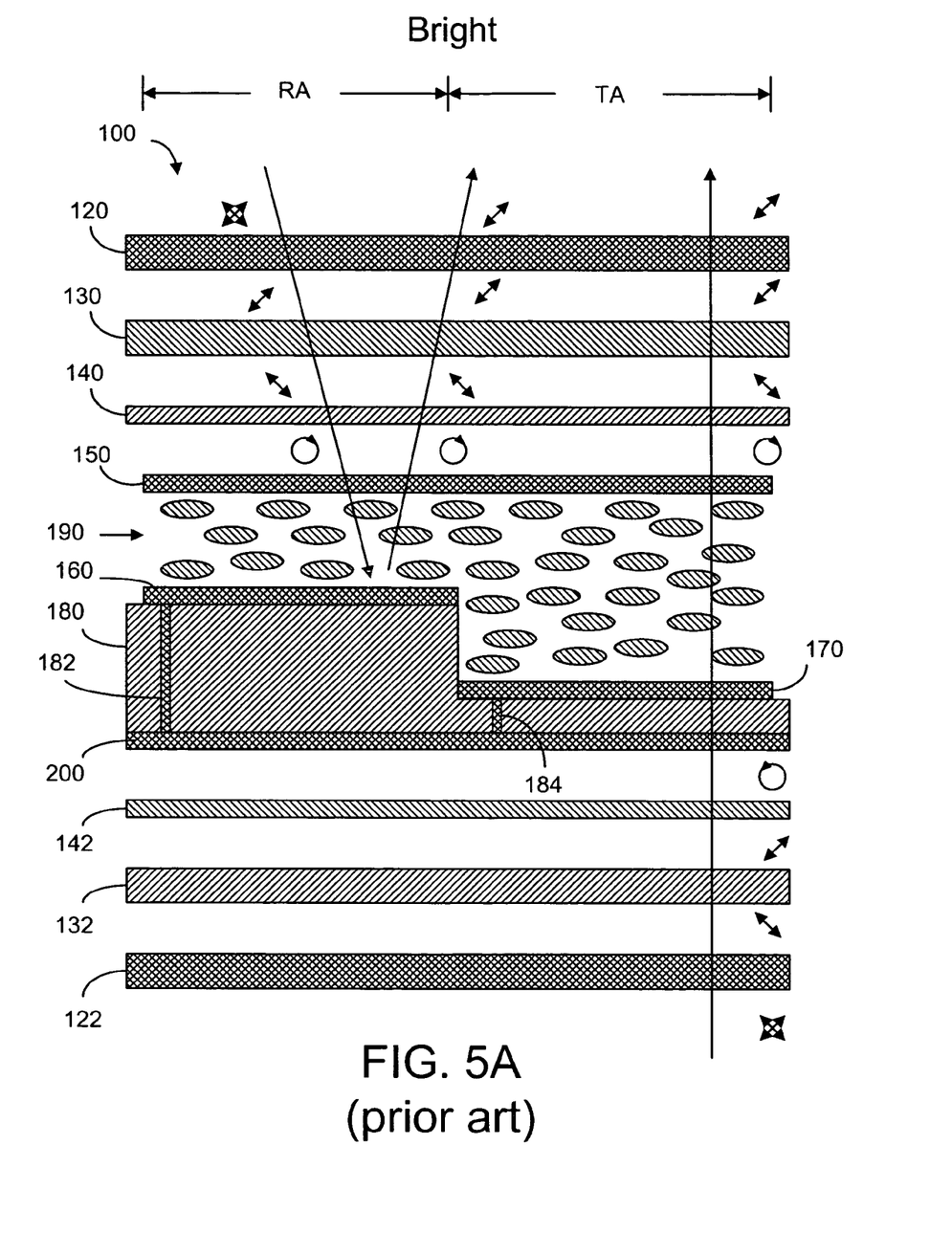
FIG. 5A is a schematic representation showing the polarization states of a light beam in a prior art MTN normally white dual-gap LCD when the LCD is operated in the "bright" state.
Figure 5B:
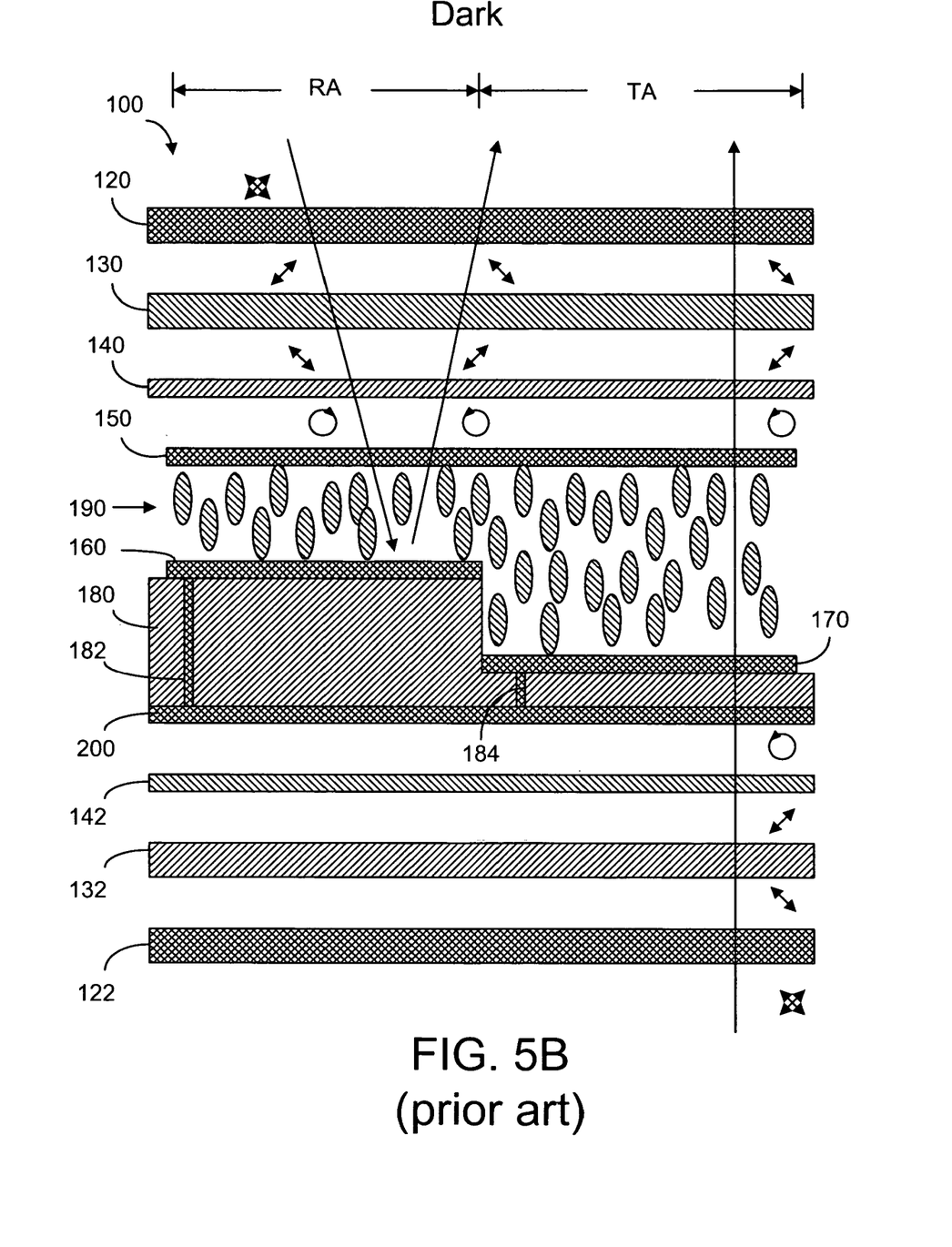
FIG. 5B is a schematic representation showing the polarization states of a light beam in the prior art LCD of FIG. 5B when the LCD is operated in the "dark" state.

A normally white modulated twisted nematic LCD is shown in FIGS. 5A and 5B. As shown in FIG. 5A, when the applied voltage across the liquid crystal layer 190 is low, the liquid crystal molecules are aligned along with the surface of the upper electrode 150 such that the liquid crystal layer 190 acts like a half-wave plate in both the transmission area and the reflection area. When the applied voltage across the liquid crystal layer 190 is high, the liquid crystal layer no longer acts as a half-wave plate. The liquid crystal layer 190 does not change the polarization state of a light beam traversing the layer, as show in FIG. 5B.

While the optical characteristics of a dual-gap transflective LCD are superior to those of a single-gap transflective LCD, the manufacturing process for controlling the gap in the reflection area in relation to the gap in the transmission area is complex. The production yield for dual-gap transflective LCDs is generally lower than that of single-gap transflective LCDs.

It is thus desirable and advantageous to provide a method for achieving a transflective LCD having the advantages of both the single-gap transflective LCD and the dual-gap transflective LCD.

SUMMARY OF THE INVENTION

The transflective LCD, according to the present invention, is based on a single-gap design so as to simplify the manufacturing process. Advantageously, the transflective LCD, according to the present invention, also achieves the matching between the transmittance in the transmission area and the reflectance in the reflection area when the LCD is operated between two states. By using different applied voltages in the transmission and reflection areas, it is possible to cause the change in the optical characteristics of the liquid crystal layer in the transmission area between operating states to be different from the change in the optical characteristics of the liquid crystal layer in the reflection area. More particularly, in the first operating state, the liquid crystal layer in the transmission area and the liquid crystal layer in the reflection area are used as a half-wave plate to change the linear polarization axis of the traversing light. In the second operating state, the liquid crystal layer in the transmission area does not affect the polarization axis of the traversing light, but the liquid crystal layer in the reflection area is used as a quarter-wave plate. As such, no additional half-wave plates and quarter-wave plates are needed.

It is preferable that the change in the voltage potential applied to the liquid crystal layer in the transmission area is two times the change in the voltage potential applied to the liquid crystal layer in the reflection area between operating states. In order to achieve such changes, it is possible to apply different voltage potentials on the electrodes in transmissive and the reflective areas. It is also possible to dispose a dielectric layer in the reflection area in order to reduce the voltage potential across the liquid crystal layer in the reflection area.

The present invention will become apparent upon reading the description taken in conjunction with FIGS. 6a-10.

DETAILED DESCRIPTION OF THE INVENTION

Figure 6A:
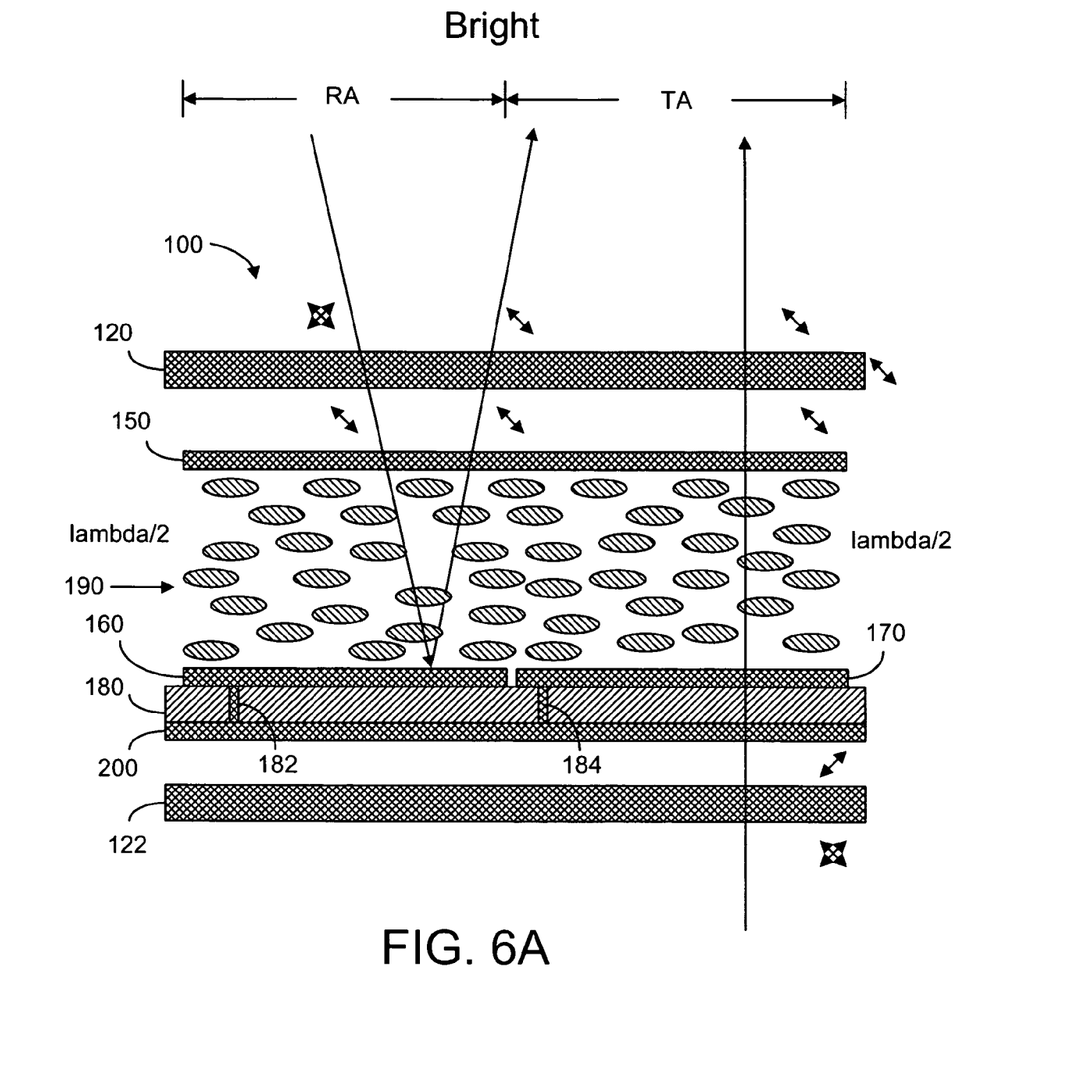
FIG. 6A is a schematic representation showing the polarization states of a light beam in an MTN normally white single-gap LCD, according to the present invention, when the LCD is operated in the "bright" state.
Figure 6B:
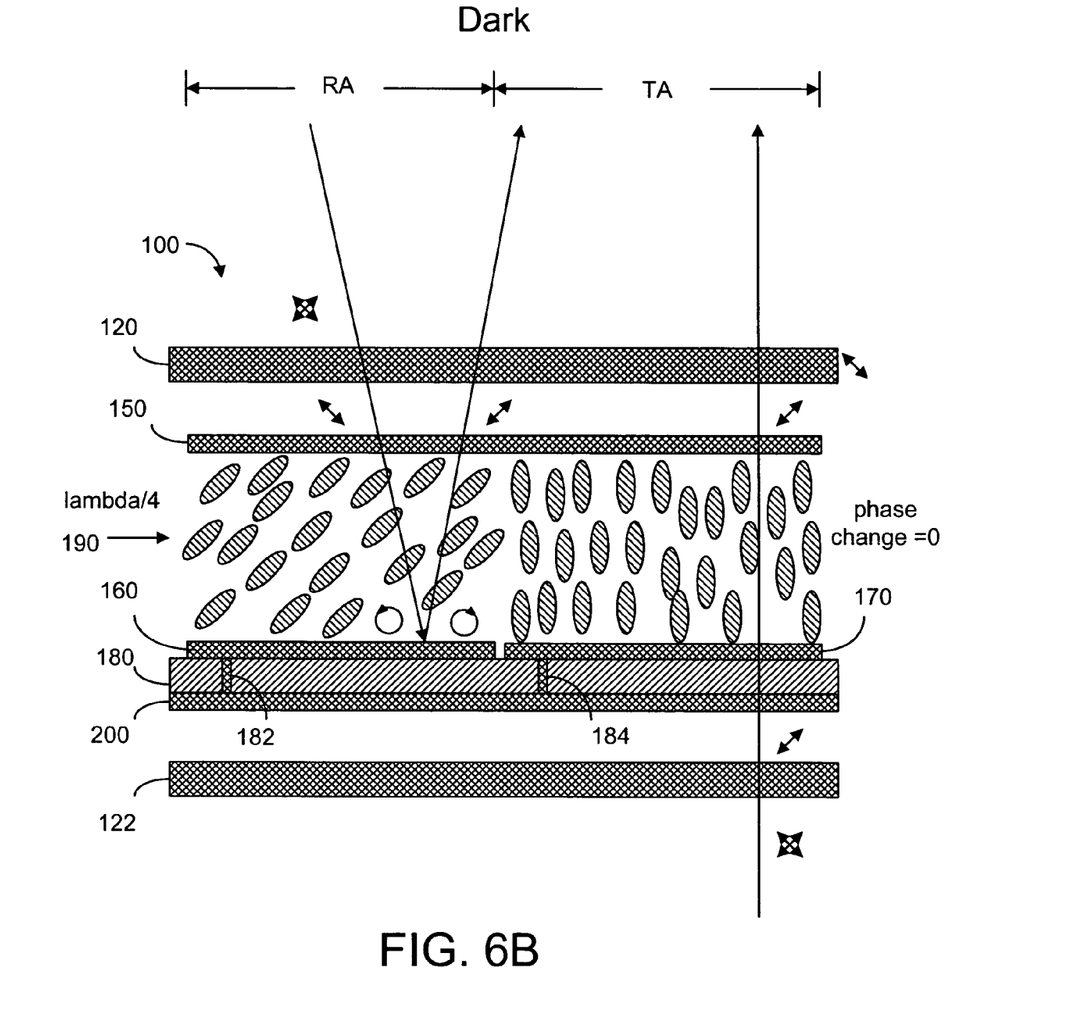
FIG. 6B is a schematic representation showing the polarization states of a light beam in the MTN normally white single-gap LCD, according to the present invention, when the LCD is operated in the "dark" state.

In contrast to the prior art modulated twisted nematic (MTN) normally white transflective LCD, the present invention does not use half-wave plates and quarter-wave plates to change the polarization states of a light beam encountering the LCD. Furthermore, the present invention uses a single-gap design to achieve a match between transmittance in the transmission area and reflectance in the reflection area of a transflective LCD. FIGS. 6A and 6B show the different states of the LCD, according to the present invention. As shown in FIG. 6A, when the transflective LCD 100 is operated in a "bright" state, the liquid crystal molecules in the liquid crystal layer 190 is oriented in a direction substantially parallel to the electrodes 150, 160 and 170. In this state, the liquid crystal layer 190 is used as a half-wave plate so that the polarization axis of a linearly polarized light beam is changed by 90°, for example. However, angles other than 90° are also possible. In the "dark" state, the applied voltage across the liquid crystal layer 190 in the transmission area causes the liquid crystal molecules to be oriented in a direction substantially perpendicular to the electrodes 150 and 170. As such, the liquid crystal layer 190 in the transmission area does not alter the polarization axis of a linearly polarized light beam. However, because the applied voltage across the liquid crystal layer 190 in the reflection area is about half of that in the transmission area, the liquid crystal molecules in the reflection area are partially tilted such that the liquid crystal layer 190 in the reflection area acts like a quarter-wave plate, causing a linearly polarized light beam to become a circularly polarized light beam when the beam traverses a distance equal to the thickness of the liquid crystal layer. Thus, the polarization axis of the exiting beam is 90° different from the polarization axis of the incoming beam, as shown in FIG. 6B.

Thus, between two operating states of the transflective LCD 100, according to the present invention, the change in the polarization property of the liquid crystal layer 190 in the transmission area is equivalent to a half-wave plate. However, the change in the polarization property of the liquid crystal layer 190 in the reflection area is equivalent to a quarter-wave plate. Optically, the single-gap transflective LCD of the present invention is equivalent to a prior art dual-gap transflective LCD.

Figure 7A:
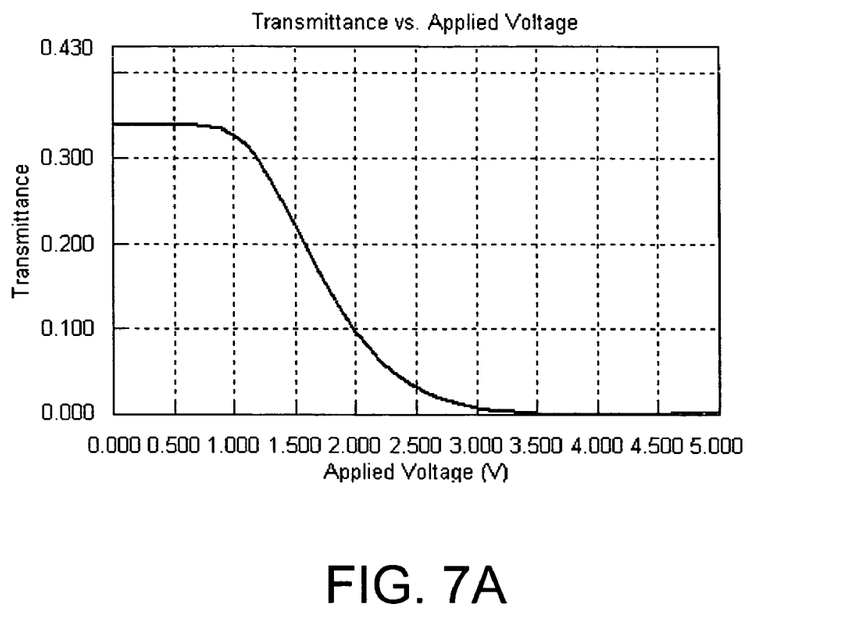
FIG. 7A is a plot of transmittance vs. applied voltage in a single-gap LCD.
Figure 7B:
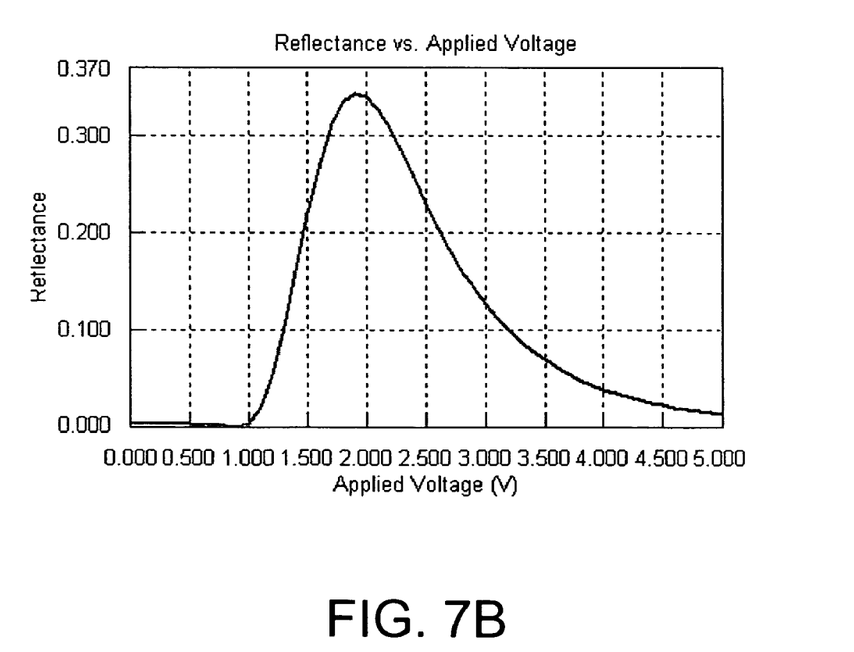
FIG. 7B is a plot of reflectance vs. applied voltage in a prior art single-gap LCD.
Figure 7C:
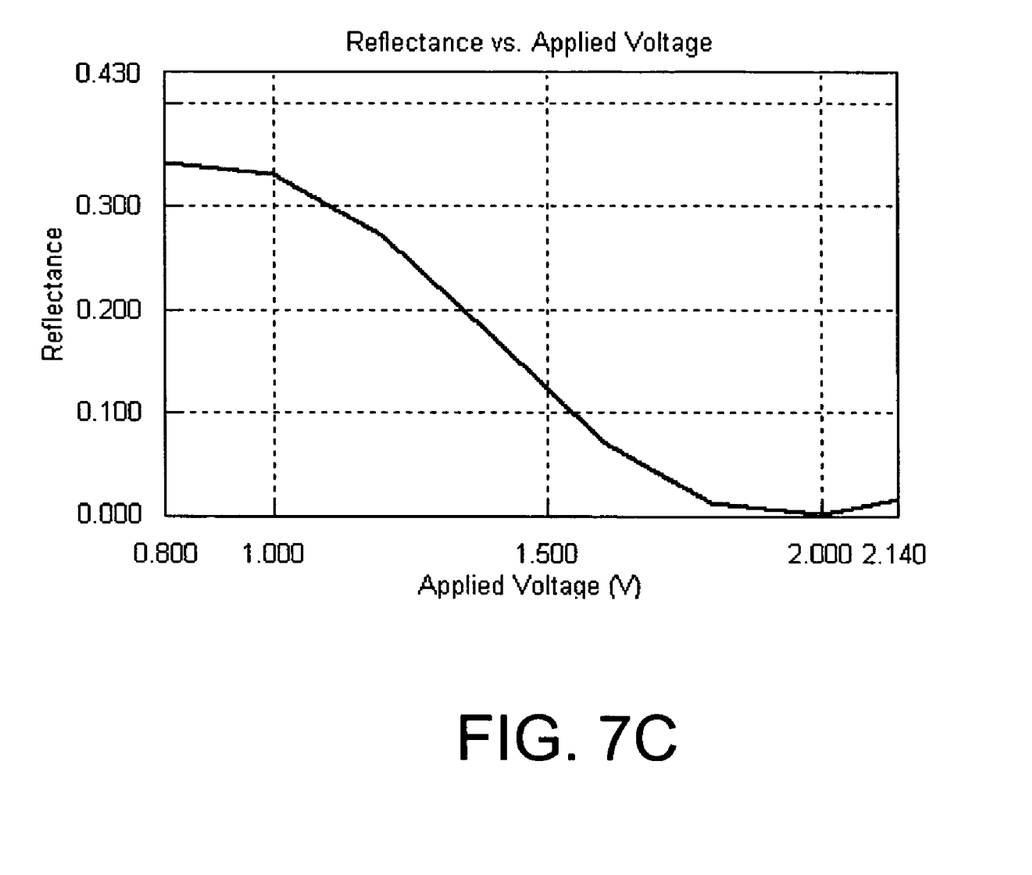
FIG. 7C is a simulated plot of reflectance vs. applied voltage in a single-gap LCD, according to the present invention.

FIGS. 7A and 7B show the mismatch between the transmittance (or transmissivity) in the transmission area and the reflectance (or reflectivity) in the reflection area as a function of applied voltage in a prior art single-gap transflective LCD. In a single-gap transflective LCD of the present invention, the reflectance as a function of the applied voltage, as shown in FIG. 7C, matches very well with the transmittance as shown in FIG. 7A.

Comparing FIG. 6A to FIG. 6B, it can be seen that when a light beam traverses a distance equal to the thickness of the liquid crystal layer in the transmission area of the transflective LCD 100, the polarization axis of the light beam between the "bright" state and the "dark" state is 90°, for example. However, a light beam traversing in the reflection area must travel twice the distance in order to experience the same change in the polarization state. Furthermore, in the prior art MTN normally white LCD (see FIGS. 5A and 5B), the light beams are circularly polarized as they enter and exit the liquid crystal layer 190. In contrast, in the MTN normally white LCD of the present invention, light beams are linearly polarized as they enter and exit the liquid crystal layer 190. In the prior art MTN LCD as shown in FIGS. 3-5B, two half-wave plates and two quarter-wave plates are used. In contrast, in the MTN LCD of the present invention, there are no half-wave plates and quarter-wave plates.

Figure 8A:
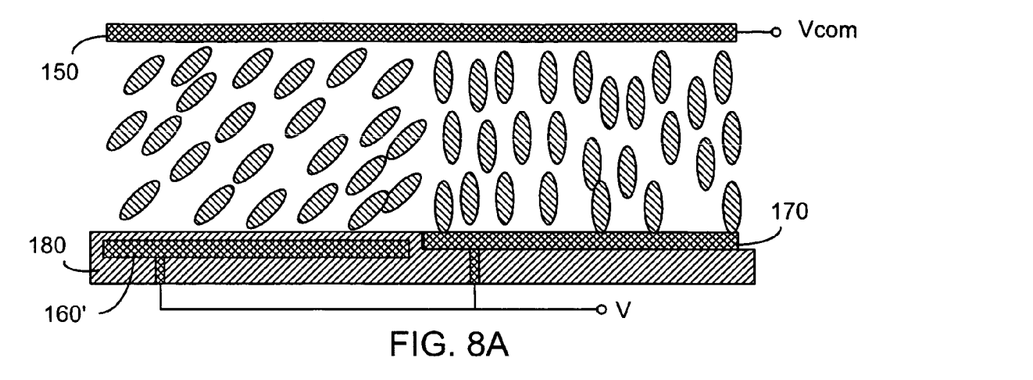
FIG. 8A is a schematic representation of an embodiment of the present invention for achieving different applied voltages in the transmission and reflection areas.

In order to achieve the different polarization changes in the transmission area and the reflection area, the voltage potential across the liquid crystal layer in the reflection area must be smaller than that in the transmission area. Preferably, the voltage potential across the liquid crystal layer in the reflection area is half of that in the transmission area. There are many ways to achieve that voltage potential difference. For example, it is possible to dispose a substantially transparent dielectric layer on top of the reflective electrode 160' so that the resulting voltage potential across the liquid crystal layer 190 in the reflection area is significantly reduced. As shown in FIG. 8A, part of the passivation layer 180 covers the reflective electrode 160'. As such, although the reflective electrode 160' and the transmissive electrode 170 are connected to the same voltage source, the orientation of the liquid crystal molecules in the transmission area and the reflection area is not the same.

Figure 8B:
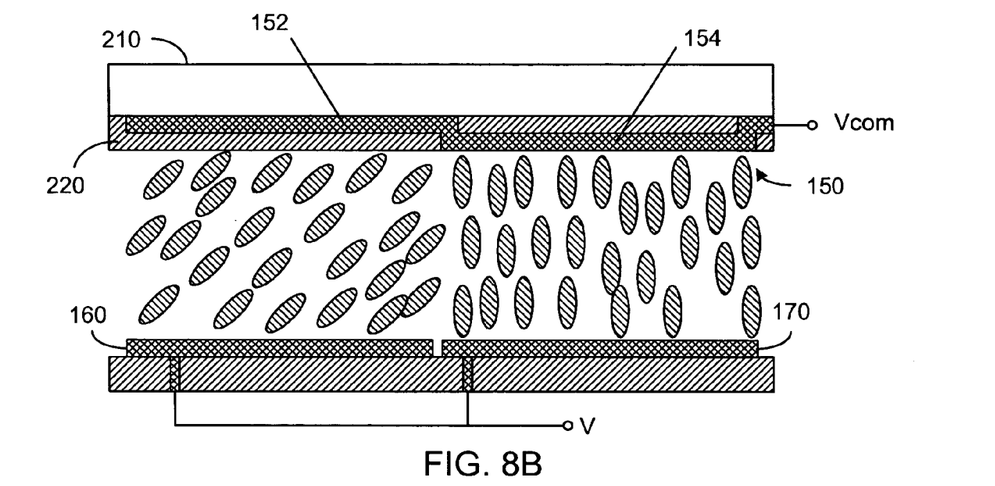
FIG. 8B is a schematic representation of another embodiment of the present invention for achieving different applied voltages in the transmission and reflection areas.

Alternatively, part of the upper electrode 150 is covered by a substantially transparent dielectric layer to reduce the voltage potential across the liquid crystal layer in the reflection area. As shown in FIG. 8B, the section 152 of the upper electrode is covered by a dielectric layer 220 on a substrate 210, whereas the section 154 of the upper electrode is exposed to the liquid crystal layer 190. In this embodiment it may not be necessary to cover the reflective electrode 160 by a dielectric layer. The reflective electrode 160 and the transmissive electrode 170 can be connected to the same voltage source.

Figure 8C:
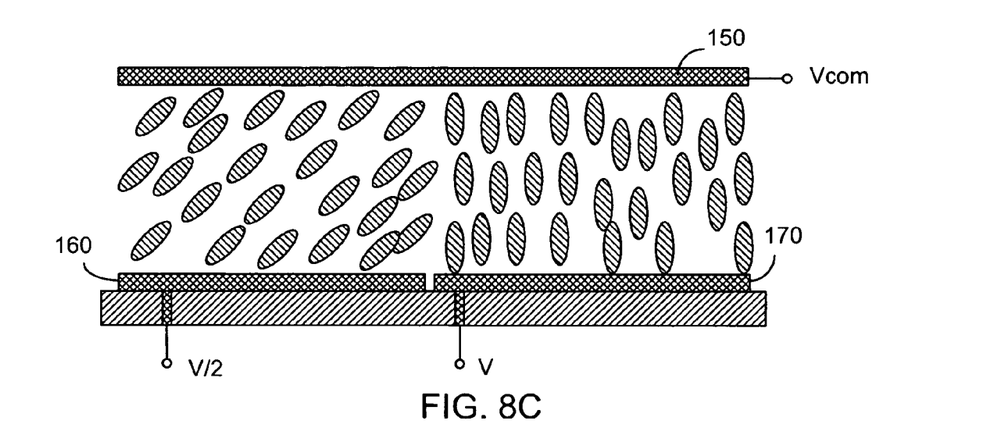
FIG. 8C is a schematic representation of yet another embodiment of the present invention for achieving different applied voltages in the transmission and reflection areas.

In a different embodiment of the present invention as shown in FIG. 8C, different voltages are applied on the reflective electrode 160 and the transmissive electrode 170.

Figure 9A:
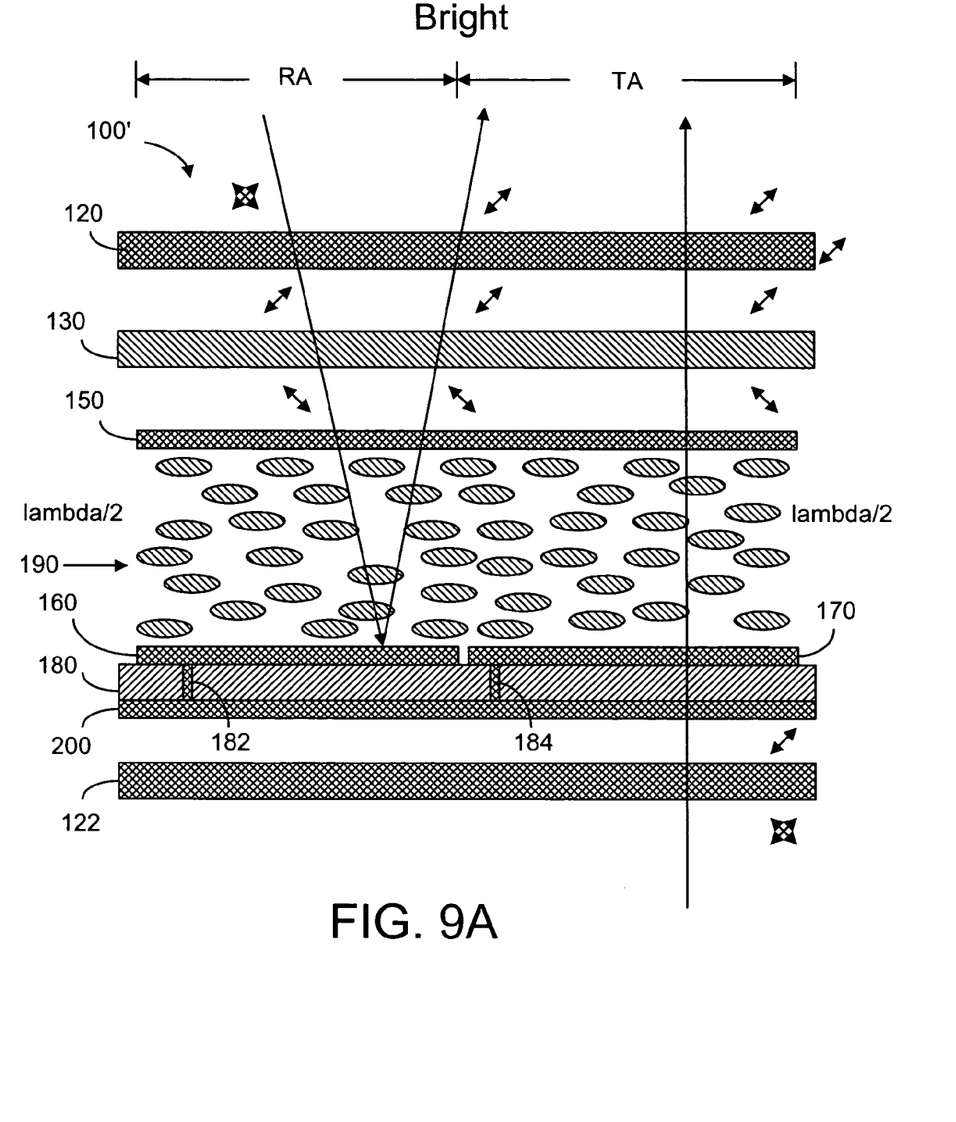
FIG. 9A is a schematic representation of a different embodiment of the present invention, when the LCD is operated in the "bright" state.
Figure 9B:
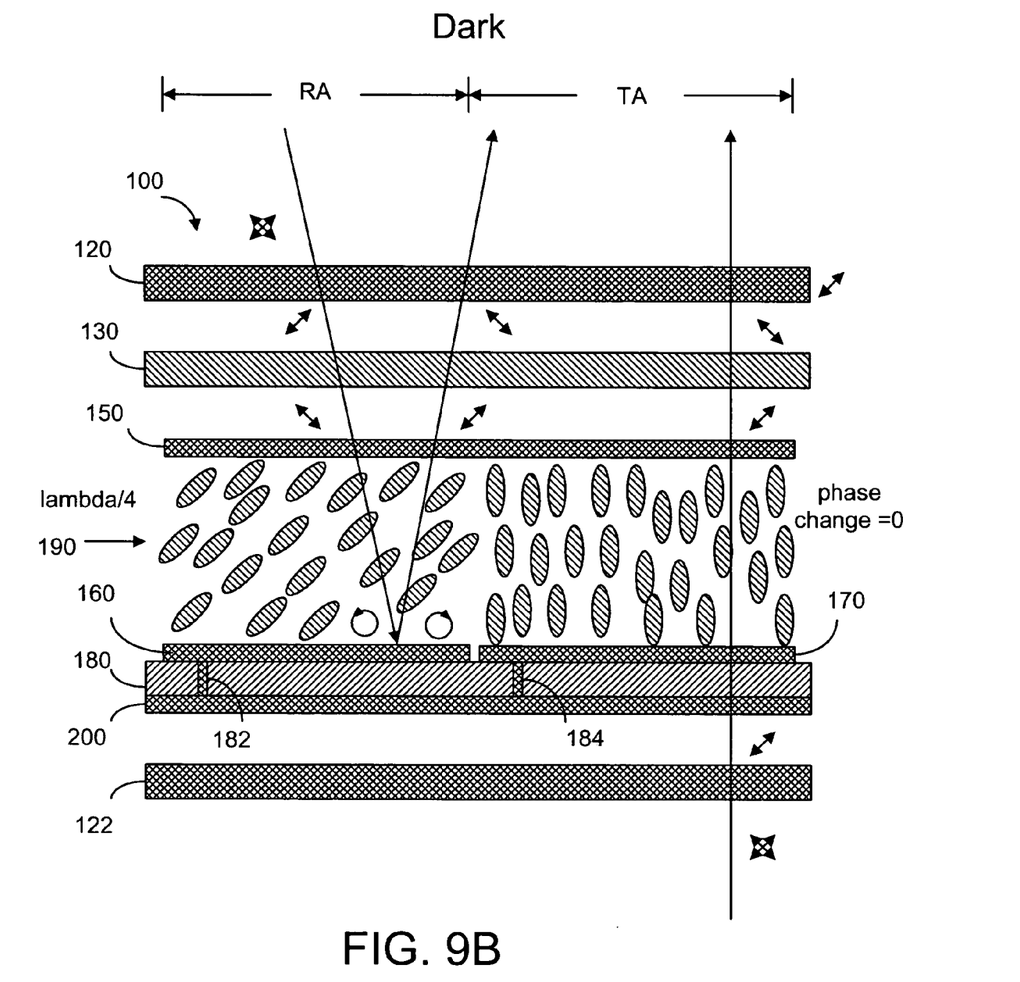
FIG. 9B is a schematic representation of a different embodiment of the present invention, when the LCD is operated in the "dark" state.
Figure 10:
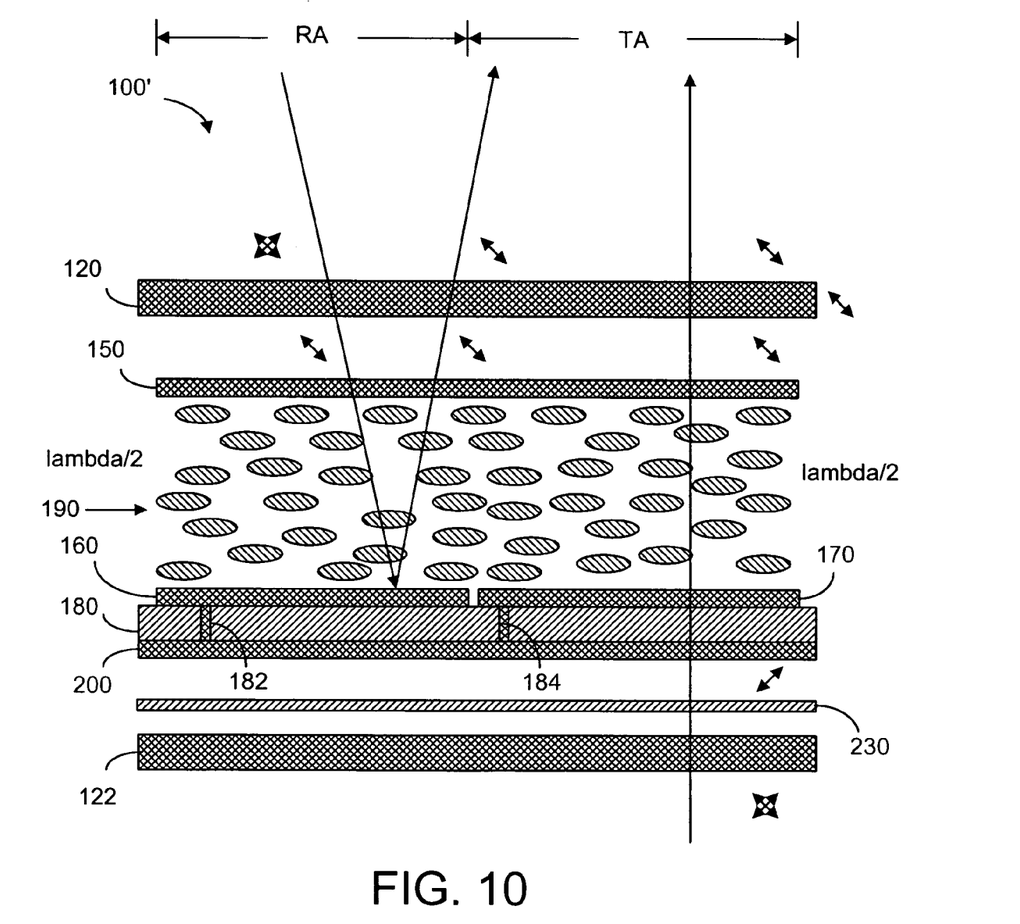
FIG. 10 is a schematic representation of yet another different embodiment of the present invention.

The embodiment as shown in FIGS. 6A and 6B can be further improved to enhance its viewing quality. For example, a half-wave plate 130 can be disposed between the upper polarizer 120 and the upper electrode 150 to improve the reflective color quality, as shown in FIGS. 9A and 9B. Furthermore, a modulation plate 230, such as a uniaxial film, a biaxial film and an LC film (a color compensator optical sheet consisting of a liquid crystalline polymer), can be disposed between the lower polarizer 122 and the lower electrode 170 to improve the contrast in the transmission area, as shown in FIG. 10.

It should be appreciated by persons skilled in the art that the embodiments as shown in FIGS. 8A to 8C are only a few exemplary techniques to achieve a "shielded" reflective electrode in order to reduce the voltage potential applied across the liquid crystal layer in the reflection area. For example, it is also possible to use capacitors to achieve the same effect.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A single-gap transflective liquid crystal display operable in a first operating state and in a second operating state, comprising:
   a first side;
   an opposing second side;
   a polarizer disposed on the first side;
   a liquid crystal layer disposed between the first and second sides, the liquid crystal layer associated with a plurality of pixels, each pixel having a transmissive area and a reflection area, wherein light encountering the transmission area enters the liquid crystal layer from the second side and leaves the liquid crystal layer from the first side; and light encountering the reflection area enters the liquid crystal layer from the first side and leaves the liquid crystal layer from the first side after traversing the liquid crystal layer; and
   a plurality of electrodes for applying a first voltage potential across the liquid crystal layer in the transmissive area and applying a second voltage potential across the liquid crystal layer in the reflection area, wherein the first and second voltage potentials are caused to change between the first and second operating states, and wherein a change in the second voltage potential is smaller than a change in a first voltage potential, the first voltage potential and the second voltage potential are chosen such that
   when the liquid crystal display is operated in the first operating state, said light encountering the transmission area is linearly polarized along different polarization axes between entering and leaving the liquid crystal layer, and said light encountering the reflection area is linearly polarized along same polarization axis when entering and leaving the liquid crystal layer, and
   when the liquid crystal display is operated in the second operating state, said light encountering the transmission area is linearly polarized along same polarization axis when entering and leaving the liquid crystal layer, and said light encountering the reflection area is linearly polarized along different polarization axes between entering and leaving the liquid crystal layer.

2. The transflective liquid crystal display of claim 1, wherein the polarizer having a first polarization axis, wherein
   when the liquid crystal display is operated in the first operating state, said light encountering the transmission area is linearly polarized along a second polarization axis different from the first polarization axis when entering the liquid crystal layer and is linearly polarized in the first polarization axis when leaving the liquid crystal layer, and said light encountering the reflection area is linearly polarized along the first polarization axis when entering and leaving the liquid crystal layer, and
   when the liquid crystal display is operated in the second operating state, said light encountering the transmission area is linearly polarized along the second polarization axis when entering and leaving the liquid crystal layer, and said light encountering the reflection area is linearly polarized along the first polarization axis when entering the liquid crystal layer and is linearly polarized along the second polarization when leaving the liquid crystal layer.

3. The transflective liquid crystal display of claim 2, further comprising a further polarizer disposed on the second side, the further polarizer having the second polarization axis.

4. The transflective liquid crystal display of claim 1, further comprising a half-wave plate disposed between the polarizer and the liquid crystal layer, the polarizer having a second polarization axis, wherein
   when the liquid crystal display is operated in the first operating state, said light encountering the transmission area is linearly polarized along the second polarization axis when entering the liquid crystal layer and is linearly polarized in a first polarization axis different from the second polarization axis when leaving the liquid crystal layer, and said light encountering the reflection area is linearly polarized along the first polarization axis when entering and leaving the liquid crystal layer, and
   when the liquid crystal display is operated in the second operating state, said light encountering the transmission area is linearly polarized along the second polarization axis when entering and leaving the liquid crystal layer, and said light encountering the reflection area is linearly polarized along the first polarization axis when entering the liquid crystal layer and is linearly polarized along the second polarization axis when leaving the liquid crystal layer.

5. The transflective liquid crystal display of claim 4, further comprising a further polarizer disposed on the second side, the further polarizer having the second polarization axis.

6. The transflective liquid crystal display of claim 3, further comprising a modulation plate disposed between the further polarizer and the liquid crystal layer.

7. A pixel structure in a transflective liquid crystal display operable in a first operating state and a second operating state, the liquid crystal display having:
 a first side;
 a second side;
 a liquid crystal layer disposed between the first and second side associated with a plurality of pixels, each pixel having a transmission area and a reflection area
 a first polarizer disposed on the first side; and
 a second polarizer disposed on the second side so that light encountering the transmission area and the reflection area is linearly polarized when entering and leaving the liquid crystal layer; said pixel structure comprising:
 a first electrode segment and a transmissive electrode in the transmission area for applying a first voltage potential across the liquid crystal layer in the transmissive area, the first electrode segment disposed on the first side and the transmissive electrode disposed on the second side, wherein the first voltage potential is caused to change between the first and second operating states;
 a second electrode segment and a reflective electrode in the reflection area for applying a second voltage potential across the liquid crystal layer in the reflective area, the second electrode segment disposed on the first side and the reflective electrode disposed on the second side, wherein the second voltage potential is caused to change between the first and second operating states; and
 a voltage sharing mechanism electrically connected to at least some of the first electrode segment, the second electrode segment, the transmissive electrode and the reflective electrode such that a change in the first voltage potential between the first and second operating states is greater than a change in the second voltage potential between the first and second operating states.

8. The pixel structure of claim 7, wherein said change in the first voltage potential is substantially equal to two times said change in the second voltage potential.

9. The pixel structure of claim 7, wherein the first electrode segment and second electrode segment are electrically connected to a common voltage source, the transmissive electrode is electrically connected to a first voltage source having a first voltage value relative to the common voltage source, and the reflective electrode is electrically connected to a second voltage source having a second voltage value relative to the common voltage source, and wherein the first voltage value is substantially equal to two times the second voltage value when the liquid crystal display is operated in the second operating state.

10. The pixel structure of claim 7, wherein the first electrode segment and second electrode segment are electrically connected to a first voltage source, the transmissive electrode is electrically connected to a second voltage source for achieving the first voltage potential, and the reflective electrode is also electrically connected to the second voltage source for achieving the second voltage potential, said pixel structure further comprising:
 a dielectric layer disposed between the reflective electrode and the liquid crystal layer in the reflection area such that the second voltage potential is substantially equal to half of the first voltage potential when the liquid crystal display is operated in the second operating state.

11. The pixel structure of claim 7, wherein the first electrode segment and second electrode segment are electrically connected to a first voltage source, the transmissive electrode is electrically connected to a second voltage source for achieving the first voltage potential, and the reflective electrode is also electrically connected to the second voltage source for achieving the second voltage potential, said pixel structure further comprising:
 a dielectric layer disposed between the second electrode and the liquid crystal layer in the reflection area such that the second voltage potential is substantially equal to half of the first voltage potential when the liquid crystal display is operated in the second operating state.

12. The pixel structure of claim 7, wherein the liquid crystal layer in the transmission area has a first thickness and the liquid crystal layer in the reflection area has a second thickness substantially equal to the first thickness.

13. The pixel structure of claim 7, wherein the liquid crystal layer in the transmission area has a first thickness and the liquid crystal layer in the reflection area has a second thickness substantially equal to one half of the first thickness.

14. A method for producing a single-gap transflective liquid crystal display operable in a first operating state and in a second operating state, the liquid crystal display having a first side and an opposing second side, said method comprising:
 providing a polarizer on the first side, wherein the liquid crystal display further comprises a liquid crystal layer between the first and second sides, the liquid crystal layer associated with a plurality of pixels, each pixel having a transmissive area and a reflection area, wherein light encountering the transmission area enters the liquid crystal layer from the second side and leaves the liquid crystal layer from the first side; and light encountering the reflection area enters the liquid crystal layer from the first side and leaves the liquid crystal layer from the first side after traversing the liquid crystal layer;
 providing, in each pixel, a first electrode in the transmissive area for applying a first voltage potential across the liquid crystal layer in the transmissive area, and a second electrode in the reflective area for applying a second voltage potential across the liquid crystal layer in the reflection area, and
 selecting the first voltage potential and the second voltage potential such that
 when the liquid crystal display is operated in the first operating state, said light encountering the transmission area is linearly polarized along different polarization axes between entering and leaving the liquid crystal layer, and said light encountering the reflection area is linearly polarized along same polarization axis when entering and leaving the liquid crystal layer, and
 when the liquid crystal display is operated in the second operating state, said light encountering the transmission area is linearly polarized along same polarization axis when entering and leaving the liquid crystal layer, and said light encountering the reflection area is linearly polarized along different polarization axes between entering and leaving the liquid crystal layer.

15. The method of claim 14, wherein the polarizer having a first polarization axis, such that when the liquid crystal display is operated in the first operating state, said light encountering the transmission area is linearly polarized along a second polarization axis different from the first polarization axis when entering the liquid crystal layer and is linearly polarized in the first polarization axis when leaving the liquid crystal layer, and said light encountering the reflection area is linearly polarized along the first polarization axis when entering and leaving the liquid crystal layer, and when the liquid crystal display is operated in the second operating state, said light encountering the transmission area is linearly polarized along the second polarization axis when entering and leaving the liquid crystal layer, and said light encountering the reflection area is linearly polarized along the first polarization axis when entering the liquid crystal layer and is linearly polarized along the second polarization when leaving the liquid crystal layer.

16. The method of claim 15, further comprising providing a further polarizer on the second side, the further polarizer having the second polarization axis.

17. The method of claim 14, further comprising providing a half-wave plate between the polarizer and the liquid crystal layer, the polarizer having a second polarization axis, so that when the liquid crystal display is operated in the first operating state, said light encountering the transmission area is linearly polarized along the second polarization axis when entering the liquid crystal layer and is linearly polarized in a first polarization axis different from the second polarization axis when leaving the liquid crystal layer, and said light encountering the reflection area is linearly polarized along the first polarization axis when entering and leaving the liquid crystal layer, and when the liquid crystal display is operated in the second operating state, said light encountering the transmission area is linearly polarized along the second polarization axis when entering and leaving the liquid crystal layer, and said light encountering the reflection area is linearly polarized along the first polarization axis when entering the liquid crystal layer and is linearly polarized along the second polarization axis when leaving the liquid crystal layer.

18. The method of claim 17, further comprising providing a further polarizer on the second side, the further polarizer having the second polarization axis.

19. The method of claim 16, further comprising providing a modulation plate disposed between the further polarizer and the liquid crystal layer.

* * * * *